Nov. 26, 1929.  J. G. PAULIN  1,737,331
INSTRUMENT FOR MEASURING VARIABLE FORCES
Filed Nov. 10, 1927
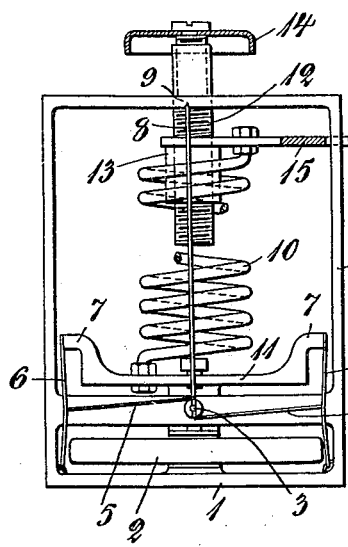
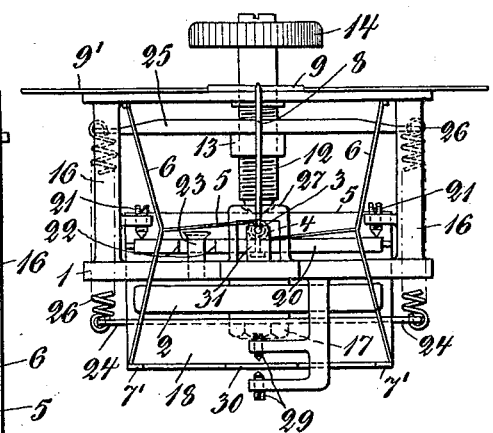
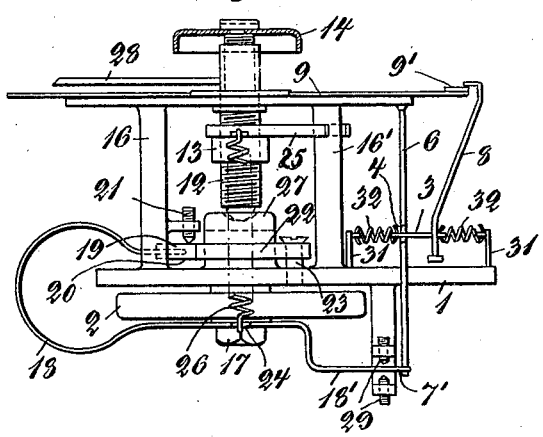
J. G. Paulin
INVENTOR
By Marks & Clerk
Attys Patented Nov. 26, 1929

1,737,331

UNITED STATES PATENT OFFICE

JOSUA GABRIEL PAULIN, OF STOCKHOLM, SWEDEN

INSTRUMENT FOR MEASURING VARIABLE FORCES

Application filed November 10, 1927, Serial No. 232,429, and in Sweden November 22, 1926.

The present invention refers to such instruments for measuring of variable forces in which the movable measuring member is actuated by the varying forces to be measured on the one hand and by a counteracting spring system on the other hand, the tension of said spring system being adapted to be varied by means of a zeroizing device for reading off the instrument according to the zero method.

The invention relates to improvements in the said counteracting spring system and will be described in the following with reference to the accompanying drawing. Figure 1 is a front view of an instrument of known kind for measuring gas pressure, in which instrument the counteracting spring system consists of a single helical spring adapted to be regulated. Figures 2 and 3 show a front view and an elevation respectively of an embodiment of the invention adapted for the same purpose.

In both of the instruments shown, the measuring member consists of an evacuated diaphragm box 2 secured to a frame plate 1, said box being of the type generally used in aneroid barometers, the same being actuated by the external gas pressure, for instance the atmospheric pressure, on the one side, and by the counteracting spring system on the other side. The movements of the diaphragm are transmitted to the spindle 3 of the pointer by a system of strings, bands or equivalent flexible members serving as a gearing device, the said system consisting in known manner of two bands or strings 5 connected each with one end of a transversal pin 4 on the pointer spindle, and of two bands or strings 6 connected at their middle points with the strings 5, the upper ends of said bands or strings 6 being attached in the frame while their lower ends are attached each at one of two arms extending from the diaphragm, said arms being denoted by 7 in Figure 1, and by 7' in Figures 2, 3. The pointer is spring actuated in such a manner that the band system is stretched, the strings 5 being thus bent angularly. The pointer spindle 3, which is pivotally arranged in a suitable manner, carries the pointer 8, the free end of which plays over a small zeroizing scale attached to the frame as at 9.

In the known arrangement according to Figure 1, the spring system acting on the diaphragm and intended to balance the atmospheric pressure consists of a strong helical spring 10, the lower end of which is attached to a yoke-shaped part 11 connected with the diaphragm and carrying the arms 7, while the upper end of said helical spring is connected with a nut 13 threaded onto a micrometer screw 12. The micrometer screw is provided at its upper end with a turning knob 14. The nut 13 is provided with a laterally projecting arm 15, the forked outer end of which embraces a post 16 in the frame, said post serving as a guide, so that the nut will be raised or lowered, on rotation of the micrometer screw, without taking part in the rotary movement, the said nut thus increasing or decreasing the tension of the spring. Inasmuch as a very strong spring must be used to balance the entire air pressure acting on the diaphragm and as, moreover, this spring must be very severely tempered in order to avoid subsequent elastic actions, great practical difficulties are met with in arranging suitable attachments for the spring at the diaphragm or the nut respectively. In regard to the severe tempering of the spring and also with respect to the central arrangement of the zeroizing mechanism it is not possible to bend the ends of the spring so that the points of attachment will be situated on the axis of the spring. Instead, the ends must be bent axially direct from the circumferences of the two outermost coil windings, as shown in Figure 1. The eccentric positions of the points of attachment involve the disadvantage that the attachments are subjected to great bending moments, whereby the spring will, as has been shown by experience, be subjected to a continuous setting action entailing faulty indications of the instrument. Moreover, by reason of the severe tempering of the spring, the making of threads at the ends thereof for securing the spring by means of nuts involves special difficulties and costs.

According to the present invention, these drawbacks are avoided by the spring system balancing the atmospheric pressure being composed, first, of a leaf-spring having a constant tension practically independent of the zeroizing device, said tension being adapted to balance per se approximately the atmospheric pressure, and, second, of one or more springs adapted to be controlled by means of the zeroizing device, it being possible to select the tension of said springs comparatively low, as it only represents the difference between the atmospheric pressure acting on the diaphragm and the constant tension of the leaf-spring. A leaf-spring may be tempered without difficulty to a very much higher degree of tempering than a spiral spring, which latter is apt to cast or warp on severe tempering. The attachment of the leaf-spring at the diaphragm as well as at the frame may be made very rigid, without any bending or threading of the tempered material being resorted to. The adjustable springs may be made in the form of spiral springs, their attachments not offering any difficulties on account of their comparatively small tension.

In the embodiment of the invention as illustrated, in Figures 2 and 3 the diaphragm box is secured to the lower side of the frame plate 1. Attached by means of a nut 17 against the downwardly directed diaphragm of the diaphragm box is the one shank of a yoke-shaped leaf-spring 18, the upper shank of which is clamped along its front edge into an interstice 19 provided in a bar 20. This latter bears on the upper side against two stop screws 21, the points of which engage corresponding recesses in the bar, and is provided with a forwardly projecting arm 22, the yoke-shaped end of which is engaged with the head of a screw 23 threaded into the frame plate. The tension of the leaf-spring 18, which is greater than the atmospheric pressure acting on the diaphragm, may be adjusted to a certain extent by means of the screws 21 and 23.

On both sides of the point of attachment at the diaphragm, the leaf-spring is provided with laterally projecting laps 24 forming attachments for the lower ends of each of two helical springs 26, the upper ends of which are secured to a yoke 25 rigidly connected with a nut 13 adapted to be adjusted vertically in the same way as the corresponding nut in Figure 1. The micrometer screw 12 engaging the nut is journalled at its lower end in a fixed journal bearing 27. The parts 10 to 14 together form a zeroizing device for restoring the diaphragm to a certain normal position with the aid of the indications of the zero pointer 8. The zeroizing device, the adjustment of which may be read off on a fixed scale by means of a pointer 28 attached to the micrometer screw, serves to regulate the tensions of the comparatively weak helical springs 26, whereas the tension of the leaf-spring 18 is independent of the zeroizing device. The said reading scale preferably occupies the major portion 9' of a circular disk provided on the upper side of the frame, whereas the rest of the circumference of this disk is occupied by the zeroizing scale 9.

In the embodiment of the invention as illustrated, the controllable helical springs 26 obviously counteract the constant leaf-spring 18, the tension of which should in this case be greater than the occurring atmospheric pressures. Evidently, the arrangement may instead be so devised that the controllable springs act in the same direction as the constant leaf-spring, in which case the tension of the latter obviously should be smaller than the occurring air pressures.

The lower shank of the leaf-spring 18 is provided with an angularly bent extension 18' forming a tongue 30 between two stop screws 29, said tongue limiting the movements of the diaphragm, and also forming the two lateral projections or arms 7', which form the movable points of attachment for the system of bands or strings 5, 6, constituting, in a manner already described in connection with Figure 1, a gearing device inserted between the diaphragm and the pointer spindle 3. The latter is suspended between two fixed supports 31 by means of helical springs 32 tending to turn the pointer spindle in a certain direction of rotation. Through this elastic suspension of the zero pointer 8 the frictional resistances and the play occurring in ordinary pivotal mounting devices are eliminated. As, in addition, the gearing device formed by the soft and flexible bands or strings 5, 6 also operates practically frictionless and without play, the movable system of the instrument possesses a very high degree of easy movement, which makes it possible to select a great ratio of gear and to secure a very high degree of sensibility.

When the tension of the helical springs 26 is so adapted that the resulting spring force of the diaphragm accurately balances the atmospheric pressure, the pointer 8 occupies its middle position and points at the zero line of the zero scale 9. If the atmospheric pressure decreases, the diaphragm will be bulged downwardly by reason of the excess tension of the leaf-spring 18, the obtuse angles of the bands 6 being somewhat increased, the zero pointer 8 being then deflected to the left (Figure 2). In order now to restore the diaphragm to the normal position for the purpose of reading off the instrument, the zeroizing knob 14 is obviously to be turned in a clockwise direction, until the pointer again points at zero. By this turning movement, the nut 13 and the yoke 25 will be raised, whereby the tension of the helical springs 26 is increased, the resulting spring tension of the diaphragm being consequently reduced into agreement with the reduced air pressure. On a rising air pressure, the compensation takes place reversely by turning the knob 14 in the opposite direction, whereby the tension of the helical springs is reduced and the total spring tension on the diaphragm is increased.

The total turning movement of the zeroizing knob 14 at the moment at which the pointer 8 is adjusted at zero, obviously constitutes a measure of the air pressure prevailing for the time being, which pressure may thus be read off directly by means of the pointer 28 on the scale pertaining thereto.

I claim:

1. An instrument for measuring variable forces comprising in combination a measuring member movable under the influence of said forces, a yoke-shaped leaf-spring connected with the measuring member so as to counter-act the variable forces, a helical spring system cooperating with said leaf spring, means for varying the tension of said helical spring system so as to balance the force to be measured by the resultant spring tension acting on the measuring member.

2. An instrument as claimed in claim 1, characterized by the helical spring system consisting of a number of springs arranged symmetrically with respect to the middle plane of the leaf spring.

3. An instrument for measuring variable forces comprising in combination a measuring member movable under the influence of said forces, a yoke-shaped leaf-spring connected with the measuring member so as to counter-act the variable forces, a displaceable fixture provided in the frame of the instrument, a helical spring system inserted between the said fixture and the measuring member and means for adjusting said fixture so as to vary the tension of the helical spring system.

4. In an aneroid-barometer in combination, a yoke-shaped leaf-spring connecting the diaphragm with the frame, a displaceable fixture in the frame, a helical spring system inserted between said fixture and the diaphragm, and means for adjusting said fixture so as to vary the tension of the helical spring system.

5. An aneroid-barometer as claimed in claim 4, characterized by the helical spring system being secured between the movable shank of the leaf-spring on the one side and a nut threaded onto a rotatable screw on the other side.

6. An instrument as claimed in claim 1, characterized by the fact that the movements of the measuring member are transmitted to the zero pointer through the medium of an extension of the movable shank of the leaf-spring, said shank thus forming a lever arm adapted to magnify the movement.

7. An instrument as claimed in claim 1, characterized by the fact that the movements of the measuring member are transmitted through the medium of the movable shank of the leaf-spring or an extension of said shank adapted to magnify the movements, onto a gearing device for the pointer operating frictionless and without play and formed by flexible members.

8. An instrument as claimed in claim 1, characterized by the pointer being suspended by means of elastic suspension members.

In testimony whereof I affix my signature.
JOSUA GABRIEL PAULIN.